United States Patent
Ye et al.

(10) Patent No.: US 11,749,471 B2
(45) Date of Patent: Sep. 5, 2023

(54) COMBINATION ELECTRONIC SWITCH WITH TRANSFORMABLE COMBINATION

(71) Applicant: Xiamen Tenia Lighting & Electrical Co., Ltd., Fujian (CN)

(72) Inventors: Zhijian Ye, Fujian (CN); Fudi Su, Fujian (CN); Cheng Zhou, Fujian (CN); Wenlong Zhang, Fujian (CN)

(73) Assignee: Xiamen Tenia Lighting & Electrical Co., Ltd., Fujian (CN)

( * ) Notice: Subject to any disclaimer, the term of this patent is extended or adjusted under 35 U.S.C. 154(b) by 495 days.

(21) Appl. No.: 17/111,655

(22) Filed: Dec. 4, 2020

(65) Prior Publication Data

US 2021/0398754 A1    Dec. 23, 2021

(30) Foreign Application Priority Data

Jun. 23, 2020 (CN) .......................... 202021185980.4

(51) Int. Cl.
*H01H 9/08* (2006.01)
*H01H 9/02* (2006.01)
*H01H 3/12* (2006.01)

(52) U.S. Cl.
CPC ............ *H01H 9/08* (2013.01); *H01H 9/0271* (2013.01); *H01H 3/12* (2013.01)

(58) Field of Classification Search
None
See application file for complete search history.

(56) References Cited

U.S. PATENT DOCUMENTS

| | | | |
|---|---|---|---|
| 2002/0050807 A1* | 5/2002 | Janik | H01R 13/6675 |
| | | | 320/137 |
| 2006/0148442 A1* | 7/2006 | Liu | H04B 1/3883 |
| | | | 455/347 |
| 2009/0267789 A1* | 10/2009 | Lin | G08C 23/04 |
| | | | 340/12.54 |
| 2017/0118808 A1* | 4/2017 | Archer | H05B 45/10 |
| 2018/0020531 A1* | 1/2018 | Fultz | H05B 47/105 |
| 2020/0235532 A1* | 7/2020 | Zhou | H01R 13/717 |
| 2022/0215740 A1* | 7/2022 | Eckelkamp | G08B 25/008 |

* cited by examiner

*Primary Examiner* — Jared Fureman
*Assistant Examiner* — Esayas G Yeshaw
(74) *Attorney, Agent, or Firm* — Cooper Legal Group, LLC

(57) ABSTRACT

The present disclosure discloses a combination electronic switch with a transformable combination, which comprises a control operation module, a power and execution module, and a panel mounting module. The control operation module comprises a drive control assembly and an operation component, the power and execution module comprises a drive execution assembly, and the drive control assembly of the control operation module is electrically connected to the drive execution assembly of the power and execution module through preset assemblies. The control operation module is fixedly clamped to the power and execution module, and the panel mounting module is fixed on the power and execution module through the control operation module or directly fixed on the power and execution module.

13 Claims, 20 Drawing Sheets

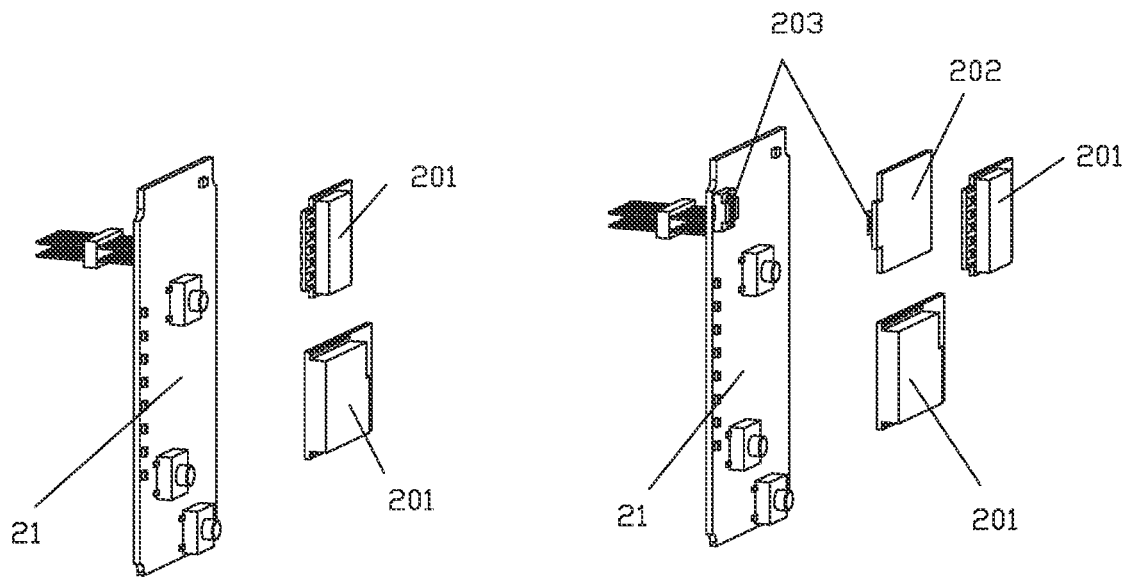
FIG. 34
FIG. 35
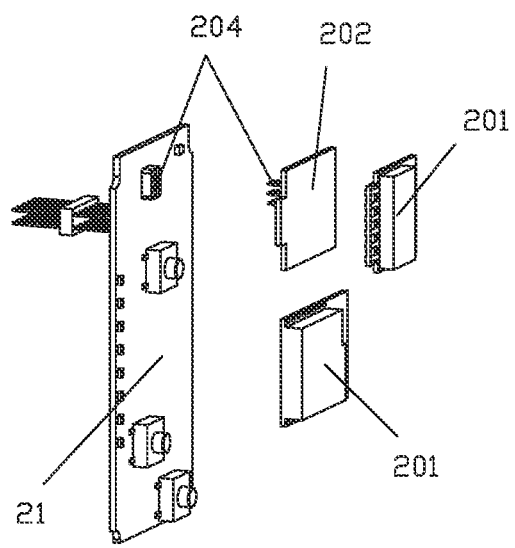
FIG. 36

COMBINATION ELECTRONIC SWITCH WITH TRANSFORMABLE COMBINATION

RELATED APPLICATIONS

This application claims priority to Chinese patent application number 202021185980.4, filed on Jun. 23, 2020. Chinese patent application number 202021185980.4 is incorporated herein by reference.

FIELD OF THE DISCLOSURE

The present disclosure relates to an electronic switch, and in particular relates to a combination electronic switch with a transformable combination.

BACKGROUND OF THE DISCLOSURE

A switch refers to an electronic element that can open a circuit, interrupt a current, or make the current flow to other circuits. The most common switch is an electromechanical device that is operated by a human. Within switches, there are one or several electronic contacts. Closing the contact means that the electronic contact is conductive, allowing current to flow. Opening the contact or establishing an open circuit means that the electronic contact is not conductive and forms an open circuit, and current is not allowed to flow. There are many types of switches. In terms of control forms, there are knob type, button type (single button/double button/three button), touch type, rocker type, induction type, button induction type, etc. The electronic switches of the existing technologies adopt integrated design. When the user chooses a knob type switch and wants to replace it with a touch type switch, the user must entirely remove the knob type switch and entirely replace it with the touch type switch, which will increase the cost to the user and causes waste of products (knob type switches). For manufacturers, different product designs are required for different product combinations, resulting in higher production costs for manufacturers and weakening the competitiveness of products.

BRIEF SUMMARY OF THE DISCLOSURE

The present disclosure provides a combination electronic switch with a transformable combination to overcome the deficiencies of the existing techniques. Various components can be replaced at will to achieve a variety of different functional combinations due to a structural improvement, which can not only meet customer personalized needs, but also reduces product costs and development cycles.

The technical solution of the present disclosure to solve the technical problems is as follows: a combination electronic switch with a transformable combination comprises a control operation module, a power and execution module, and a panel mounting module. The control operation module comprises a drive control assembly comprising a preset drive control electronic element and an operation component configured to cooperate with the preset drive control electronic element, the power and execution module comprises a drive execution assembly comprising a preset drive execution electronic element and is configured to supply power for the control operation module, and the drive control assembly of the control operation module is electrically connected to the drive execution assembly of the power and execution module through preset assemblies. The control operation module is fixed on the power and execution module, and the panel mounting module is fixed on the power and execution module through the control operation module or directly fixed on the power and execution module.

In a preferred embodiment, the control operation module is disposed with at least one communication module configured to cooperate with the preset drive control electronic element so as to be in communication with an external device, and the at least one communication module is fixed or detachably fixed on a circuit board of the drive control assembly.

In a preferred embodiment, one of the control operation module and the power and execution module is disposed with one or more elastic fixing claws, the other of the control operation module and the power and execution module is disposed with one or more clamping holes, and the control operation module is fixed on the power and execution module through cooperation between the one or more elastic fixing claws and the one or more clamping holes.

In a preferred embodiment, one of the control operation module and the power and execution module is disposed with a magnet, the other of the control operation module and the power and execution module is disposed with an iron part, and the control operation module is fixed on the power and execution module through an adsorption cooperation between the magnet and the iron part.

In a preferred embodiment, one of the control operation module and the power and execution module is disposed with a buckle, a turn button, or a fixing screw, the other of the control operation module and the power and execution module is disposed with a buckle hole, a turn button hole, or a fixing screw hole, and the control operation module is fixed on the power and execution module by cooperation between the buckle, the turn button, or the fixing screw and the buckle hole, the turn button hole, or the fixing screw hole.

In a preferred embodiment, near a cooperation position of the buckle and the buckle hole, each of the control operation module and the power and execution module are respectively disposed with an opening configured to facilitate a disassembly between the control operation module and the power and execution module.

In a preferred embodiment, the panel mounting module defines a frame-shaped structure, the frame-shaped structure of the panel mounting module surrounds a periphery of the control operation module, an inner side of the frame-shaped structure of the panel mounting module is disposed with a protruding flange, and the protruding flange of the panel mounting module presses on an edge of the control operation module toward the power and execution module.

In a preferred embodiment, the panel mounting module defines a frame-shaped structure, the frame-shaped structure of the panel mounting module surrounds a periphery of the control operation module, an inner side of the frame-shaped structure of the panel mounting module is disposed with a protruding flange, and an edge of the control operation module presses the protruding flange of the panel mounting module toward the power and execution module.

In a preferred embodiment, the operation component comprises at least one of a knob component, a button component, a touch component, a rocker component, a sliding component, a rotating component, a sensor component, and a detecting component.

In a preferred embodiment, the preset assemblies between the drive control assembly of the control operation module and the drive execution assembly of the power and execution module comprise at least one of a terminal, a flat cable, a lead wire, an elastic pin, an elastic sheet, a buckle, a FPC cable, and a wireless module.

In a preferred embodiment, the one or more elastic fixing claws are disposed on the control operation module, an upper portion and a lower portion or a left portion and a right portion of the control operation module are respectively disposed with a plurality of elastic fixing claws of the one or more elastic fixing claws, corresponding positions of the power and execution module are respectively disposed with the one or more clamping holes, and the plurality of elastic fixing claws of the control operation module are clamped in the one or more clamping holes of the power and execution module to enable the control operation module to be fixed on the power and execution module.

In a preferred embodiment, the one or more elastic fixing parts are fixed on the drive operation module by crewing, riveting, welding, ultrasonic, stamping, injection molding, or assembling.

In a preferred embodiment, the plurality of elastic fixing claws are fixed on the control operation module by buckles.

In a preferred embodiment, one of the control operation module and the power and execution module is disposed with a guiding protrusion, the other of the control operation module and the power and execution module is disposed with a guiding slot, and the preset assemblies between the drive control assembly of the control operation module and the drive execution assembly of the power and execution module are respectively disposed on the guiding protrusion and the guiding slot. When the guiding protrusion of the one of the control operation module and the power and execution module is disposed in the guiding slot of the other of the control operation module and the power and execution module, the drive control assembly of the control operation module is electrically connected to the drive execution assembly of the power and the execution module.

In a preferred embodiment, the power and execution module further comprises a first housing in which the drive execution assembly is disposed, the first housing comprises a rear cover and a front fixing plate, the front fixing plate is fixed on the rear cover by a buckle, screwing, riveting, welding, ultrasonic, stamping, or injection molding.

In a preferred embodiment, the power and execution module further comprises a support frame, the drive execution assembly is disposed in the support fame, and the support frame id fixed in the front fixing plate.

In a preferred embodiment, the control operation module comprises a second housing in which the drive control assembly is disposed, the second housing at least comprises an operation rear cover, and the drive control assembly of the control operation module is disposed with a module of at least one of the knob component, the button component, the touch component, the rocker component, the sliding component, the rotating component, the sensor component, and the detecting component.

Compared with the existing techniques, the technical solution has the following advantages.

1. The present disclosure adopts a control operation module, a power and execution module, and a panel mounting module to form a combination electronic switch. The control operation module has a drive control assembly comprising a preset drive control electronic element and an operation component configured to correspondingly cooperate with the preset drive control electronic element. The power and execution module has a drive execution assembly comprising a preset drive execution electronic element. The drive control assembly of the control operation module is electrically connected to the drive execution assembly of the power and execution module through preset assemblies. The control operation module is fixed to the power and execution module. The panel mounting module is fixed on the power and execution module through the control operation module or directly fixed on the power and execution module. With the aforementioned arrangement of the present disclosure, various modules can be replaced at will to form a variety of different functional combinations, which can not only meet personalized needs of the customer, but also reduce product costs and development cycles.

2. As the present disclosure uses the communication module for a communication connection with an external device in the control operation module, the arrangement can reduce the influence relative to communication signals due to metal parts of the power and execution module and the panel mounting module and minimize signal attenuation of the communication module, thereby a power consumption of the product is reduced.

BRIEF DESCRIPTION OF THE DRAWINGS

FIG. 34 illustrates a perspective view of an assembly of a communication module of a control operation module of Embodiment 9 of the present disclosure;

FIG. 35 illustrates a perspective view of an assembly of a communication module of a control operation module of Embodiment 10 of the present disclosure;

FIG. 36 illustrates a perspective view of an assembly of a communication module of a control operation module of Embodiment 11 of the present disclosure;

DETAILED DESCRIPTION OF THE EMBODIMENTS

Figure 1:
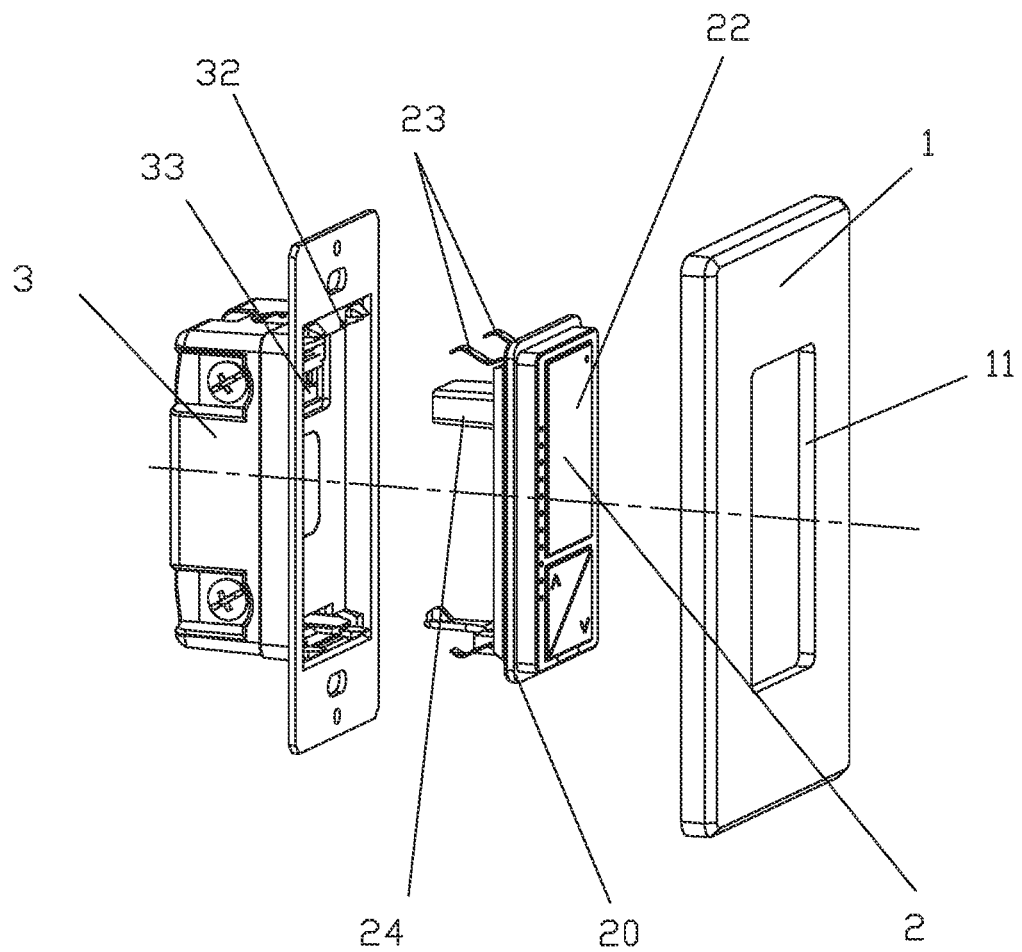
FIG. 1 illustrates an exploded view of Embodiment 1 of the present disclosure.
Figure 2:
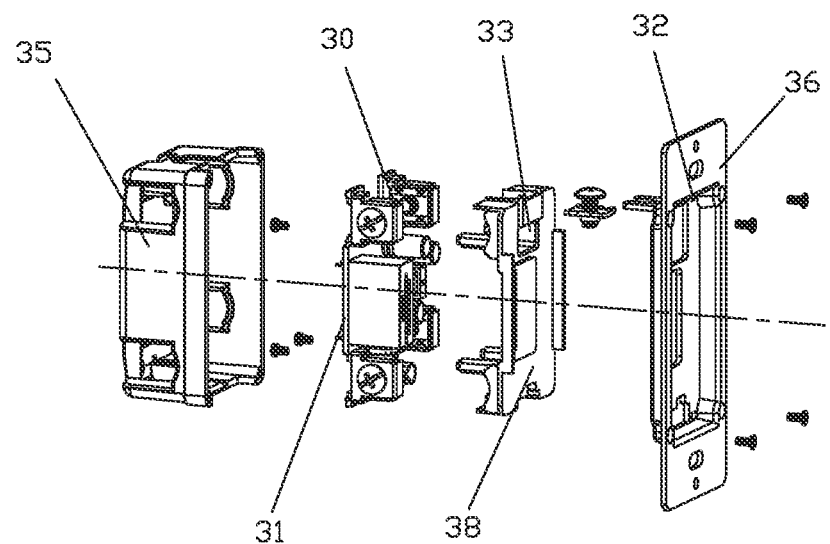
FIG. 2 illustrates an exploded view of a power and execution module (an electronic switch structure) of Embodiment 1 of the present disclosure.
Figure 3:
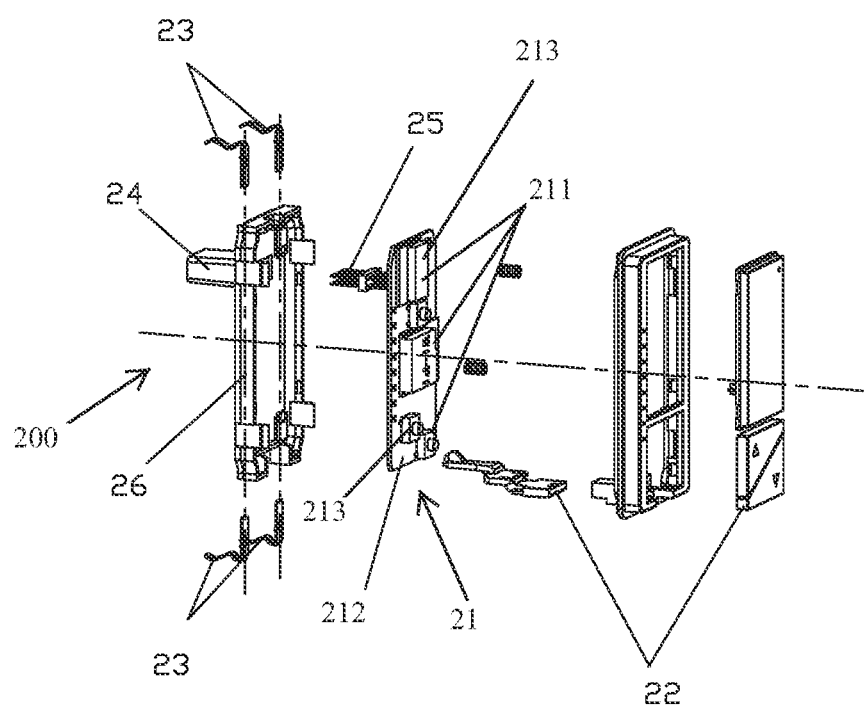
FIG. 3 illustrates an exploded view of a control operation module (using a button assembly) of Embodiment 1 of the present disclosure.
Figure 4:
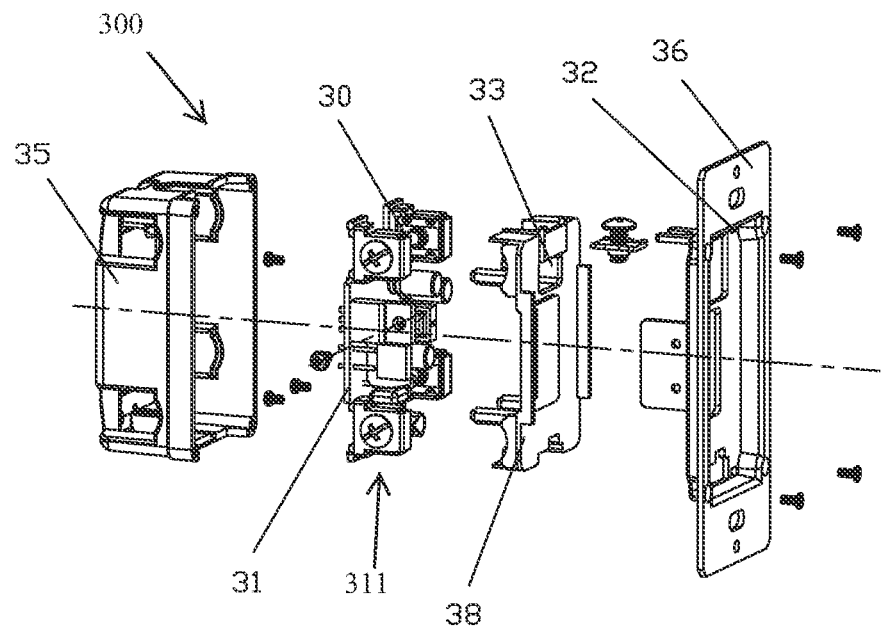
FIG. 4 illustrates an exploded view of a replacement member (a dimmer structure) of the power and execution module of Embodiment 1 of the present disclosure.
Figure 5:
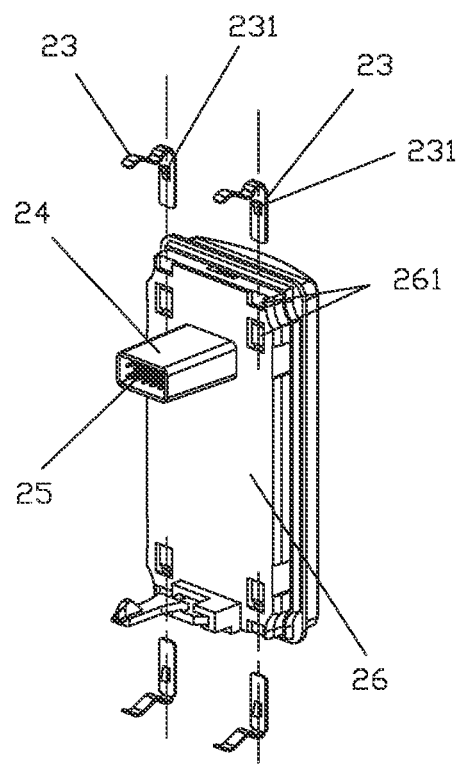
FIG. 5 illustrates a perspective view of the control operation module (using the button assembly) of Embodiment 1 of the present disclosure.
Figure 6:
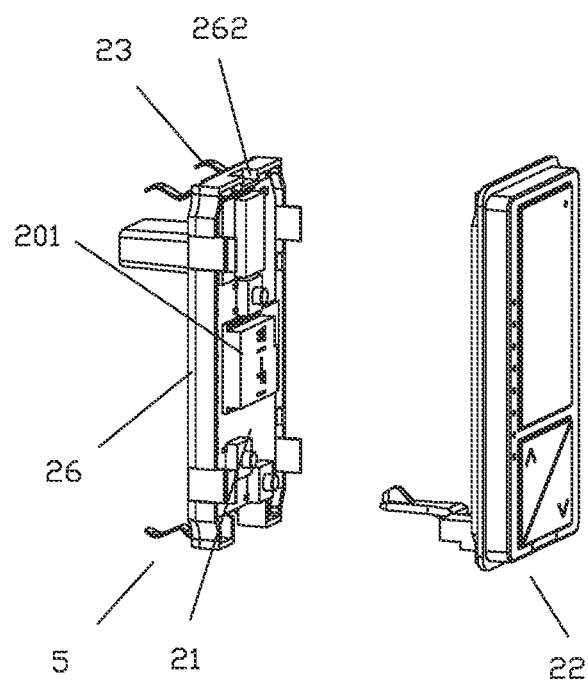
FIG. 6 illustrates an exploded perspective view of the control operation module (using the button assembly) of Embodiment 1 of the present disclosure.
Figure 7:
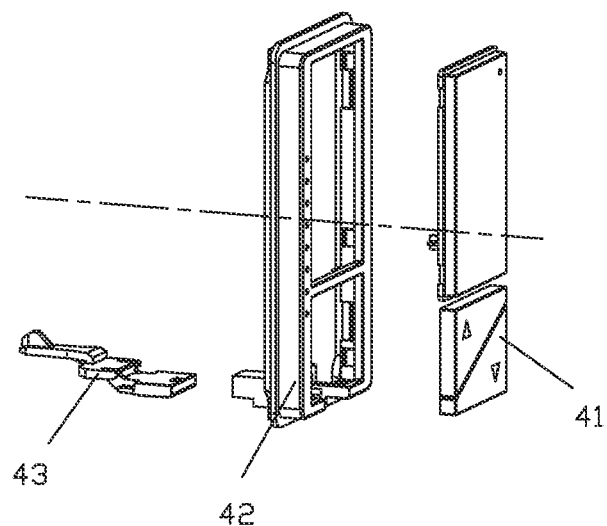
FIG. 7 illustrates an exploded perspective view of an operation control panel assembly of the control operation module (using the button assembly) of Embodiment 1 of the present disclosure.

The present disclosure will be further described below in combination with the accompanying drawings and embodiments. However, the combination electronic switch with the transformable combination of the present disclosure is not limited to the embodiments.

Embodiment 1

Referring to FIGS. 1-12, a combination electronic switch with a transformable combination of the present disclosure comprises a control operation module 2, a power and execution module 3, and a panel mounting module 1. The control operation module 2 comprises a drive control assembly 21 comprising a preset drive control electronic element 211 and comprises an operation component 22 configured to cooperate with the drive control electronic element. The power and execution module 3 comprises a drive execution assembly 31 comprising a preset drive execution electronic element 311 and is configured to supply power for the control operation module 2. The drive control assembly 21 of the control operation module 2 is electrically connected to the drive execution assembly 31 of the power and execution module 3 through preset assemblies, so that the drive control electronic element of the control operation module 2 is electrically connected to the drive execution electronic element of the power and execution module 3. One of the control operation module 2 and the power and execution module 3 is further disposed with one or more elastic fixing claws 23, the other of the control operation module 2 and the power and execution module 3 is further disposed with one or more clamping holes 32, so that the control operation module 2 is relatively fixed on (i.e., secured to or attached to) the power and execution module 3 through cooperation between the one or more elastic fixing claws and the one or more clamping holes. The panel mounting module 1 is fixed on the power and execution module 3 through the control operation module 2 or is directly fixed on the power and execution module 3.

In this embodiment, the control operation module 2 is further disposed with a communication module 201 configured to cooperate with the drive control electronic element, and the communication module 201 is used to communicate with an external device. The communication module 201 is fixed on or is detachably fixed on a circuit board of the drive control assembly 21.

In this embodiment, the panel mounting module 1 defines a frame-shaped structure, the frame-shaped structure of the panel mounting module 1 surrounds a periphery of the control operation module 2. An inner side of the frame-shaped structure of the panel mounting module 1 is disposed with a first protruding flange 11, and the first protruding flange 11 of the panel mounting module 1 presses on an edge 20 of the control operation module 2 toward the power and execution module 3.

In this embodiment, the preset assemblies between the drive control assembly 21 of the control operation module 2 and the drive execution assembly 31 of the power and execution module 3 are terminals. That is, the control operation module 2 is disposed with a terminal pin 25, the power and execution module 3 is disposed with a terminal socket 30, and electronic elements between the drive control assembly 21 and the drive execution assembly 31 are electrically connected together though a plug connection between the terminal pin 25 of the control operation module 2 and the terminal socket 30 of the power and execution module 3.

In this embodiment, the one or more elastic fixing claws 23 are disposed on the control operation module 2. An upper portion and a lower portion of the control operation module 2 are respectively disposed with two elastic fixing claws 23, and corresponding positions of the power and execution module 3 are respectively disposed with the one or more clamping holes 32. The one or more elastic fixing claws 23 of the control operation module 2 are clamped in the one or more clamping holes 32 of the power and execution module 3 to enable the control operation module 2 to be relatively fixed on the power and execution module 3.

In this embodiment, the one or more elastic fixing claws 23 is fixed on the control operation module 2 by one or more buckles. In some embodiments, the one or more elastic fixing claws 23 are disposed with one or more clamping protrusions 231, the control operation module 2 is disposed with one or more clamping slots 261, and the one or more clamping protrusions 231 of the one or more elastic fixing claws 23 are clamped in the one or more clamping slots 261 of the control operation module 2.

In this embodiment, the control operation module 2 is disposed with a guiding protrusion 24 protruding backward, and the terminal pin 25 of the control operation module 2 is disposed in the guiding protrusion 24. A corresponding position of a front portion of the power and execution module 3 is disposed with a guiding slot 33 configured to cooperate with the guiding protrusion 24 of the control operation module 2, and the terminal socket 30 of the power and execution module 3 is disposed in the guiding slot 33. When the guiding protrusion 24 of the control operation module 2 is plugged into the guiding slot 33 of the power and execution module 3, the drive control assembly 21 of the control operation module 2 is electrically connected to the drive execution assembly 31 of the power and execution module 3.

In this embodiment, the power and execution module 3 further comprises a first housing 300 in which the drive execution assembly 31 is disposed. The first housing 300 comprises a rear cover 35 and a front fixing plate 36, and the front fixing plate 36 is fixed on the rear cover 35 by screws. The drive execution assembly 31 is fixed in a cavity defined by the rear cover 35 and the front fixing plate 36 through a support frame 38. The drive execution assembly 31 is fixed on the support frame 38 by screws. The guiding slot 33 is disposed in the support frame 38, and the one or more clamping holes 32 are disposed on the front fixing plate 36.

In this embodiment, the control operation module 2 further comprises a second housing 200 in which the drive control assembly 21 is disposed. The second housing 200 at least comprises an operation rear cover 26, and the one or more elastic fixing claws 23 are fixed on the operation rear cover 26.

In this embodiment, the control operation module 2 can be divided into a control operation panel assembly (i.e., the operation component 22) and a control operation rear cover assembly 5. The drive control assembly 21 is disposed in the operation rear cover 26 to define the control operation rear cover assembly 5. The control operation panel assembly (i.e., the operation component 22) comprises a button 41, an operation panel frame 42, and a switch rod 43. The button 41 and the switch rod 43 are respectively disposed in the operation panel frame 42. The control operation panel assembly (i.e., the operation component 22) is connected to the operation rear cover 26 by buckles. At the same time, the operation rear cover 26 defines a disassembly hole 262, and the control operation panel assembly (i.e., the operation component 22) can be easily disassembled with tools and can be replaced with control operation panel assemblies with various colors.

The drive control assembly 21 of the control operation module 2 is disposed with a circuit board 212, a communication module 201, and an operation knob/button/sensor module, etc. (collectively referred to herein as "operating button 213"). The communication module can be quickly replaced, and the communication module is connected to the circuit board by plug-in terminals. The communication module can also be directly attached to the circuit board of the drive control assembly 21. The operating button is supported by elastic devices, such as a button elastic frame or a spring. A light touch switch of the operating button uses a rubber handle to improve hand feeling of the operating button and enables a pressing sound of the operating button to be clear and loud. All accessories on the control operation module 2 are assembled by buckles, which can effectively improve production efficiency and reduce costs.

The panel mounting module 1, the control operation module 2, and the power and execution module 3 are all replaceable members.

The panel mounting module 1 can be made into members with different materials (metal, plastic, etc.) and different colors. As needed, the panel mounting module 1 can be replaced. For example, an original metal panel mounting module 1 can be replaced with a plastic panel mounting module 1. The panel mounting module 1 can also be replaced to change colors. The panel mounting module 1 can be a single mounting panel or be a module consisting of several accessories.

Figure 8:
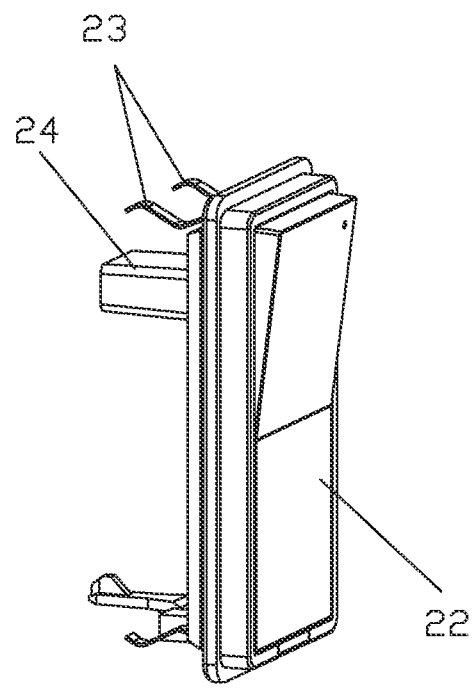
FIG. 8 illustrates a first perspective view of a first replacement member (using a rocker assembly) of the control operation module of Embodiment 1 of the present disclosure.
Figure 9:
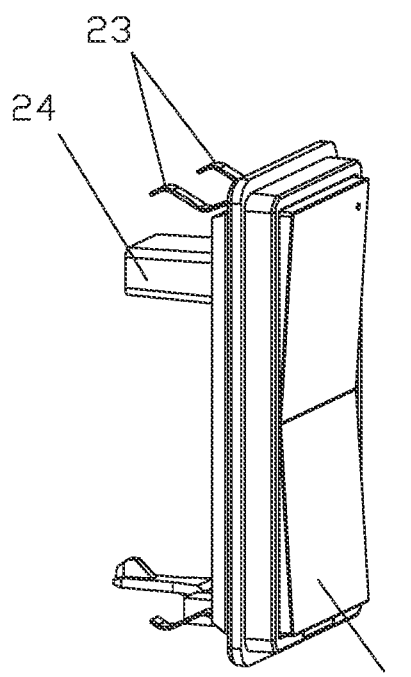
FIG. 9 illustrates a second perspective view of the first replacement member (using the rocker assembly) of the control operation module of Embodiment 1 of the present disclosure.
Figure 10:
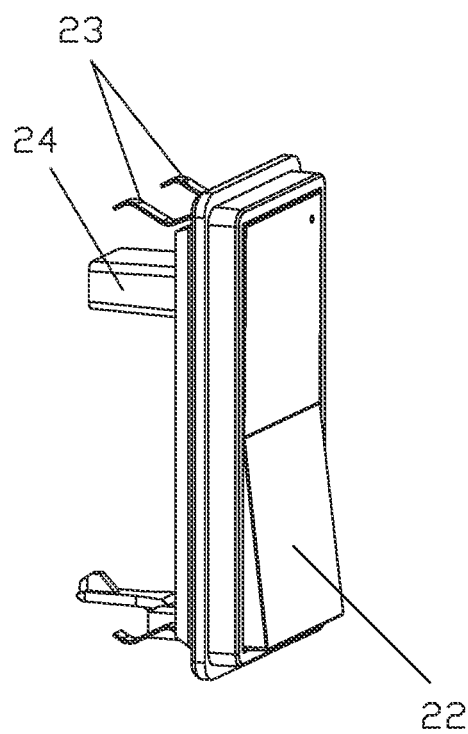
FIG. 10 illustrates a third perspective view of the first replacement member (using the rocker assembly) of the control operation module of Embodiment 1 of the present disclosure.
Figure 11:
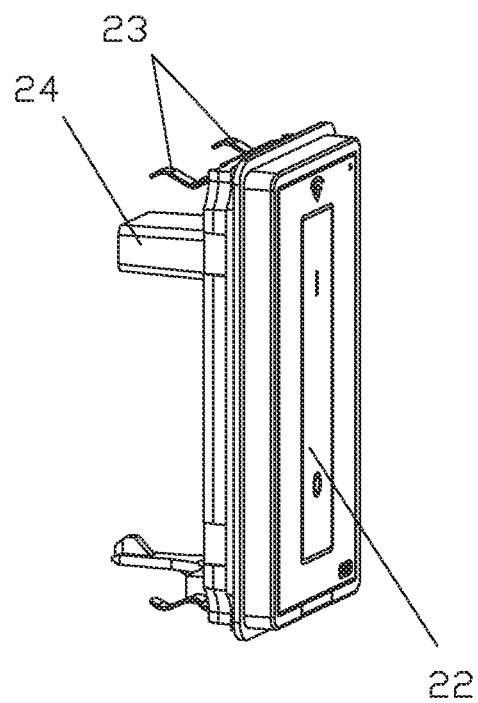
FIG. 11 illustrates a perspective view of a second replacement member (using a touch assembly) of the control operation module of Embodiment 1 of the present disclosure.
Figure 12:
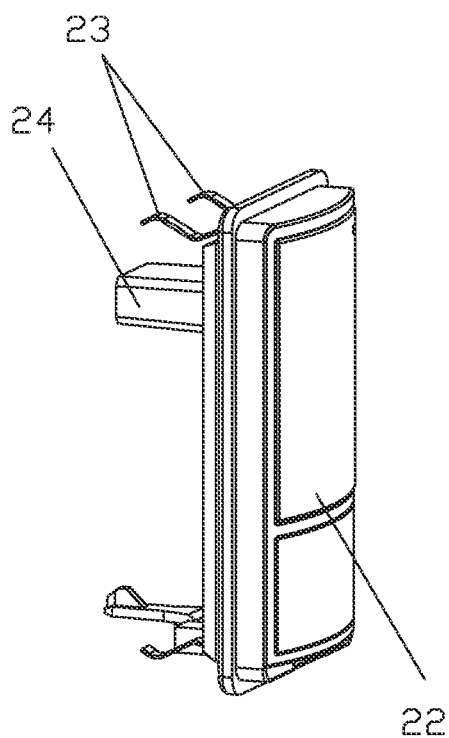
FIG. 12 illustrates a perspective view of a third replacement member (using a button sensor component) of the control operation module of Embodiment 1 of the present disclosure.
Figure 13:
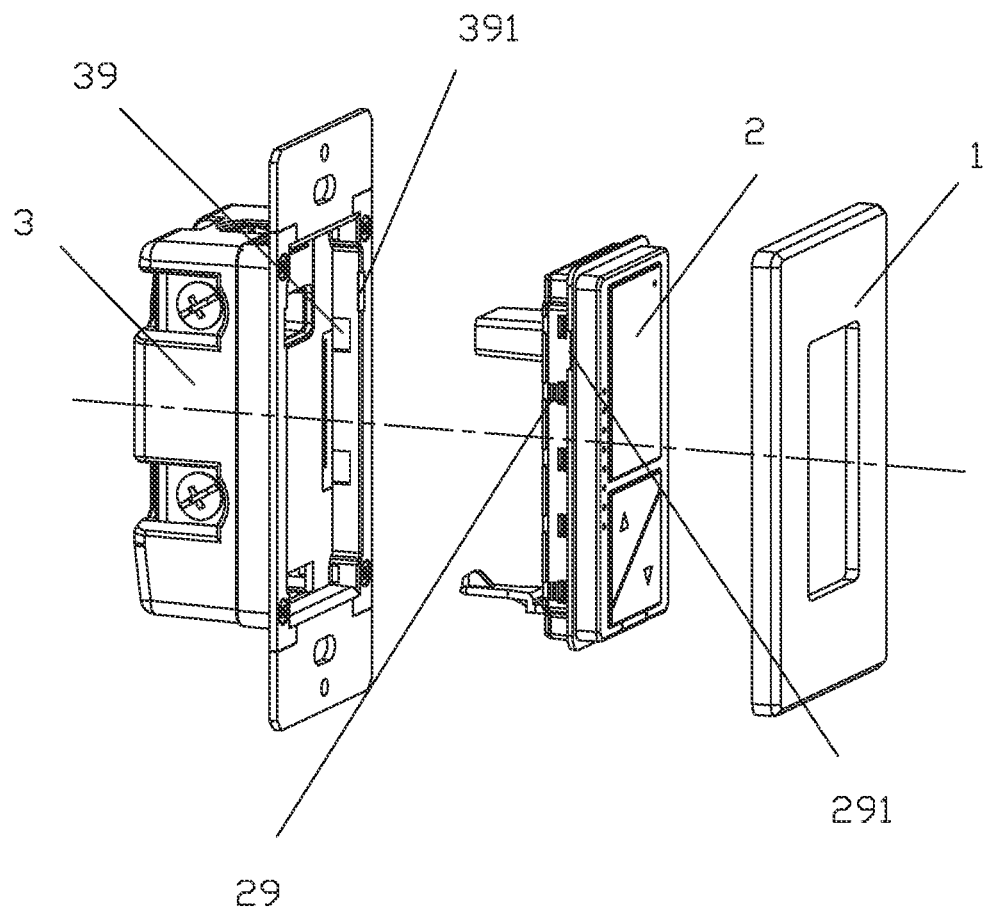
FIG. 13 illustrates an exploded view of Embodiment 2 of the present disclosure.
Figure 14:
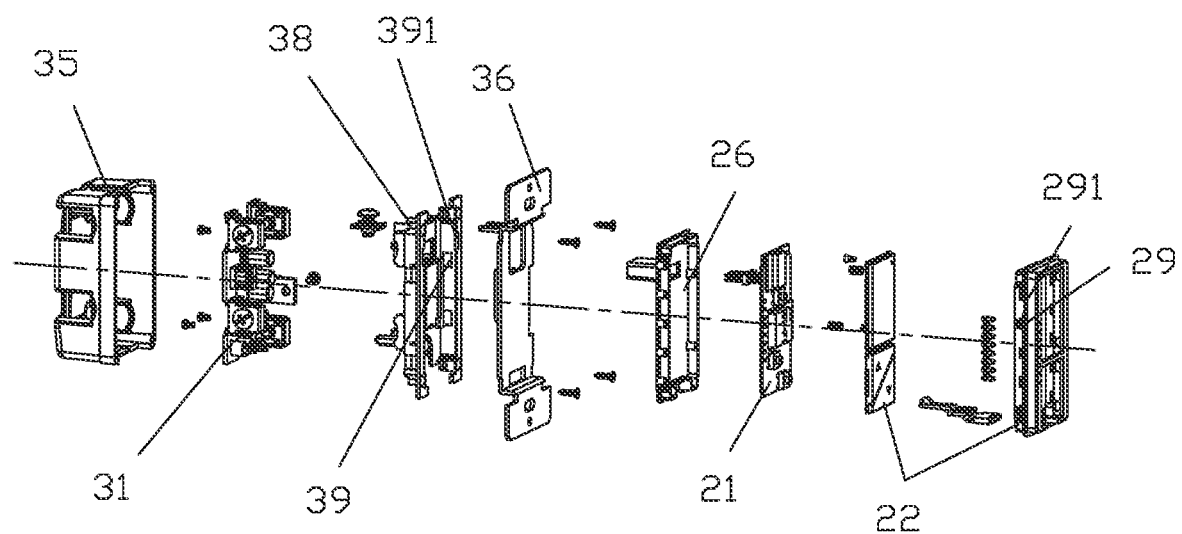
FIG. 14 illustrates a detailed exploded view of Embodiment 2 of the present disclosure.
Figure 15:
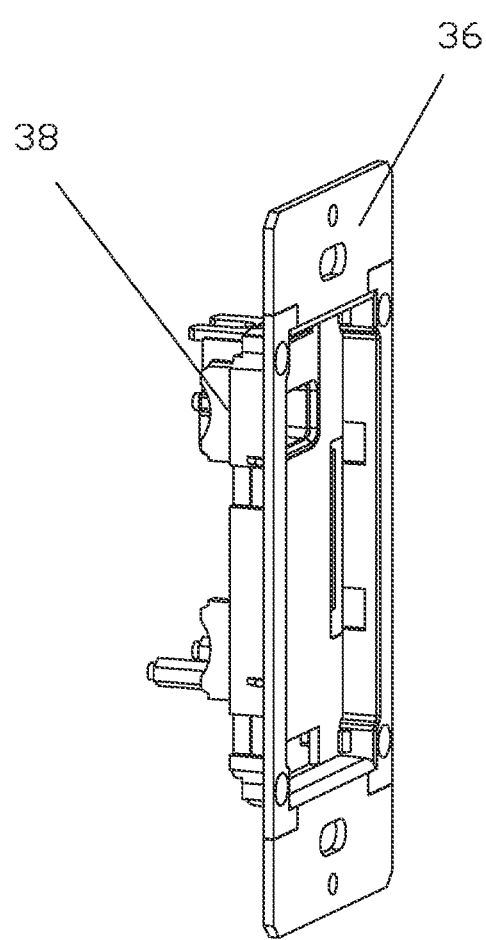
FIG. 15 illustrates a perspective view of an assembly of a front fixing plate and a support frame of Embodiment 2 of the present disclosure.
Figure 16:
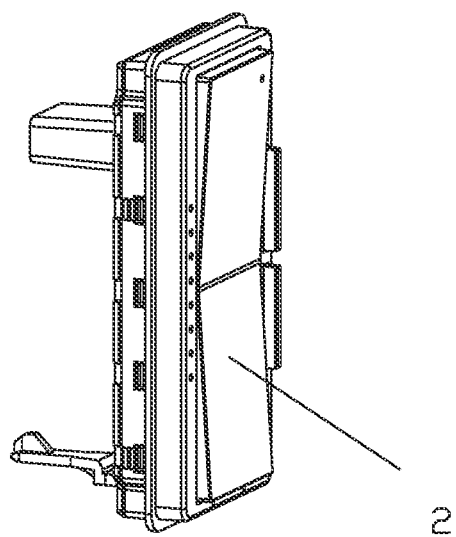
FIG. 16 illustrates a perspective view of a first replacement member (using a combination of a button and a rocker) of a control operation module of Embodiment 2 of the present disclosure.
Figure 17:
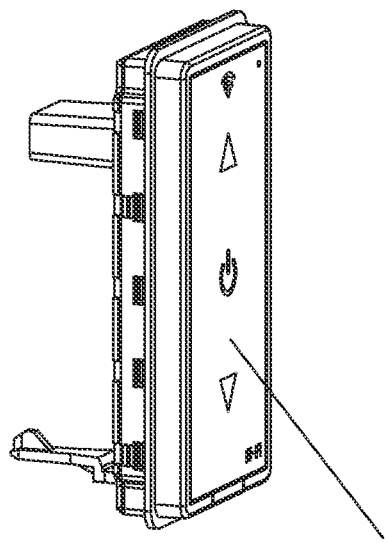
FIG. 17 illustrates a perspective view of a second replacement member (using a touch frame operation panel) of the control operation module of Embodiment 2 of the present disclosure.

The control operation module 2 can be made into components with different operation modes, such as rotation mode, pressing mode, touch mode, sensor mode, etc. The operation component 22 comprises a knob component, a button component, a touch component, a rocker component, a sensor component, or a sensor component with a button, etc. An initial operation component 22 of the control operation module 2 of this embodiment comprises a button structure (referring to FIGS. 1, 3, 5, and 6). At this time, the operation component 22 of the control operation module 2 is the button component. As needed, the control operation module 2 can be replaced. For example, the control operation module 2 comprising the button component can be replaced with the control operation module 2 comprising a rocker structure (as shown in FIGS. 8, 9, and 10). At this time, the operation component 22 of the control operation module 2 comprises the rocker component. Similarly, the control operation module 2 comprising the button component can also be replaced by the control operation module 2 comprising a touch structure (referring to FIG. 11). At this time, the operation component 22 of the control operation module 2 is the touch component. Further, the control operation module 2 comprising the button component can be replaced with the control operation module 2 comprising a sensor structure with a button (referring to FIG. 12). At this time, the operation component 22 of the control operation module 2 is the sensor component comprising the button, and a sensor portion of the sensor component with the button can be an infrared sensor, a smoke sensor, a sound sensor, etc.

The power and execution module 3 can be made into components with different execution functions, such as dimmer function, electronic switch function, etc. An initial structure of the power and execution module 3 of this embodiment is an electronic switch structure (referring to FIGS. 1 and 2). As needed, the power and execution module 3 can be replaced. For example, the power and execution module with the electronic switch structure can be replaced with the power and execution module 3 with a dimmer structure (referring to FIG. 4).

The combination electronic switch with the transformable combination of the present disclosure provides a control operation module 2, a power and execution module 3, and a panel mounting module 1 to define a combination electronic switch. The control operation module 2 comprises the drive control assembly 21 comprising the preset drive control electronic element 211 and comprises the operation component 22 configured to correspond with the drive control electronic element. The power and execution module 3 comprises the drive execution assembly 31 comprising the preset drive execution electronic element 311. The drive control assembly 21 of the control operation module 2 is electrically connected to the drive execution assembly 31 of the power and execution module 3 through the preset assemblies. The control operation module 2 is disposed with the one or more elastic fixing claws 23, and the power and execution module is disposed with the one or more clamping holes 32. The control operation module 2 is fixed on the power and execution module 3 through the cooperation of the one or more elastic fixing claws 23 and the one or more clamping holes 32. The panel mounting module 1 is fixed on the power and execution module 3 through the control operation module 2 or is directly fixed on the power and execution module 3. Various components can be replaced at will to achieve a variety of different functional combinations due to this structure of the present disclosure, which can not only meet the personalized needs of customers, but also reduce product costs and development cycles.

The present disclosure provides the combination electronic switch with the transformable combination. A communication module 201 in communication with the external device is disposed in the control operation module 2, which can reduce an influence relative to communication signals due to metal parts of the power and execution module 3 and the panel mounting module 1 and minimize signal attenuation of the communication module 201, thereby a power consumption of the product is reduced.

Embodiment 2

Referring to FIGS. 13-17, the combination electronic switch with the transformable combination of this present disclosure differs from Embodiment 1 in that the control operation module 2 is disposed with a buckle 29, and the power and execution module 3 is disposed with a buckle hole 39. The control operation module 2 is fixed on the power and execution module 3 by a cooperation between the buckle 29 of the control operation module 2 and the buckle hole 39 of the power and execution module 3. In addition, in order to facilitate disassembly and assembly, an opening 291 is disposed on the control operation module 2 at a position near the buckle 29 and an opening 391 is disposed on power and execution module 3 at a position near the buckle hole 39 to facilitate the disassembly between the control operation module 2 and the power and execution module 3.

This embodiment further differs from Embodiment 1 in that the front fixing plate 36 are made by a bending process, which can effectively improve a productive efficiency and a pass rate of the front fixing plate 36. The front fixing plate 36 is firstly fixed on the support frame 38 by buckles (referring to FIG. 15), and then the drive execution assembly 31 (i.e., a drive board with the dimmer structure) is fixed on the rear cover 35.

The control operation module 2 can use the replacement members listed in Embodiment 1 (the cooperation between the control operation module 2 and the power and execution module 3 is replaced with the buckle method). It can also be replacement members in FIGS. 16 and 17. As another example replacement member, referring to FIG. 16, at this time, the operation component 22 of the control operation module 2 is a combination of a button and a rocker. As yet another example replacement member, referring to FIG. 17, at this time, the operation component 22 of the control operation module 2 is a touch frame operation panel.

Similarly, the combination of button and rocker and the touch frame operation panel of the control operation module 2 of this embodiment can also be applied to Embodiment 1 (the buckle method is replaced with the elastic fixing method).

Embodiment 3

Figure 18:
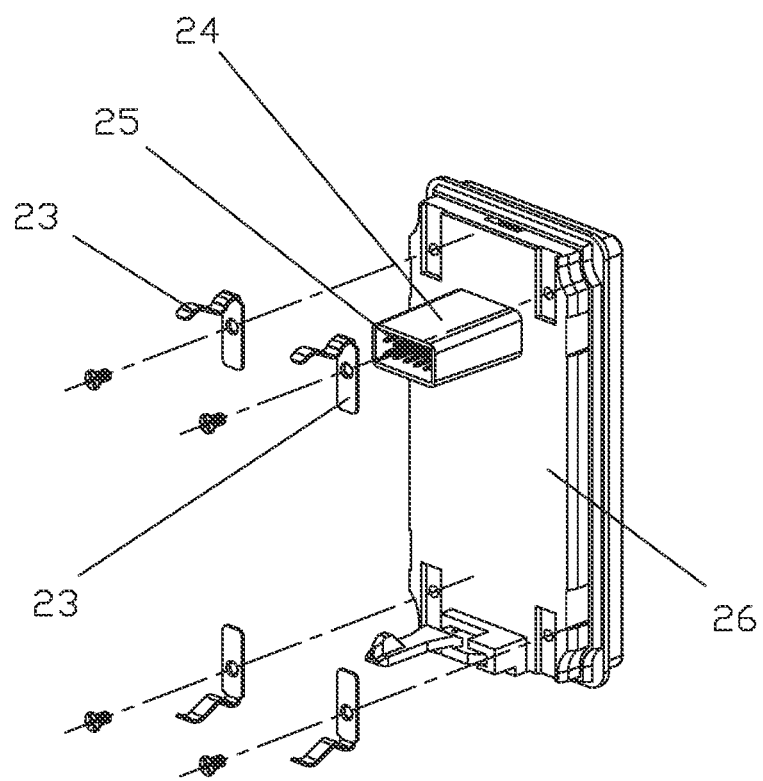
FIG. 18 illustrates a perspective view of the control operation module (using a button assembly) of Embodiment 3 of the present disclosure.

Referring to FIG. 18, the combination electronic switch with the transformable combination of the present disclosure differs from Embodiment 1 in that the one or more elastic fixing claws 23 are fixed on the operation rear cover 26 of the control operation module 2 by screws.

Embodiment 4

Figure 19:
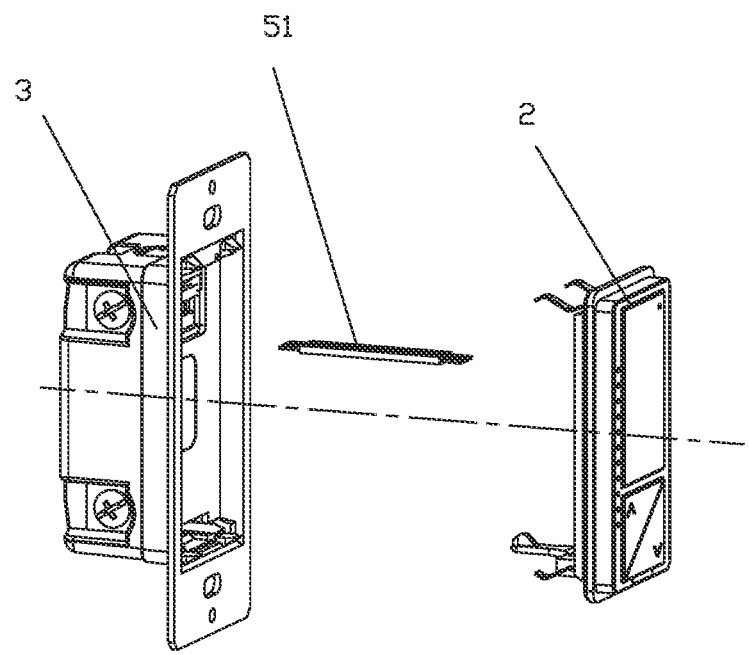
FIG. 19 illustrates an electrical connection diagram between a control operation module and a power and execution module of Embodiment 4 of the present disclosure.

Referring to FIG. 19, the combination electronic switch with the transformable combination of this present disclosure differs from Embodiment 1 in that the preset assemblies between the drive control assembly 21 of the control operation module 2 and the drive execution assembly 31 of the power and execution module 3 comprise flat cables 51, which can cooperate with plug-in terminals or crimp terminals.

Embodiment 5

Figure 20:
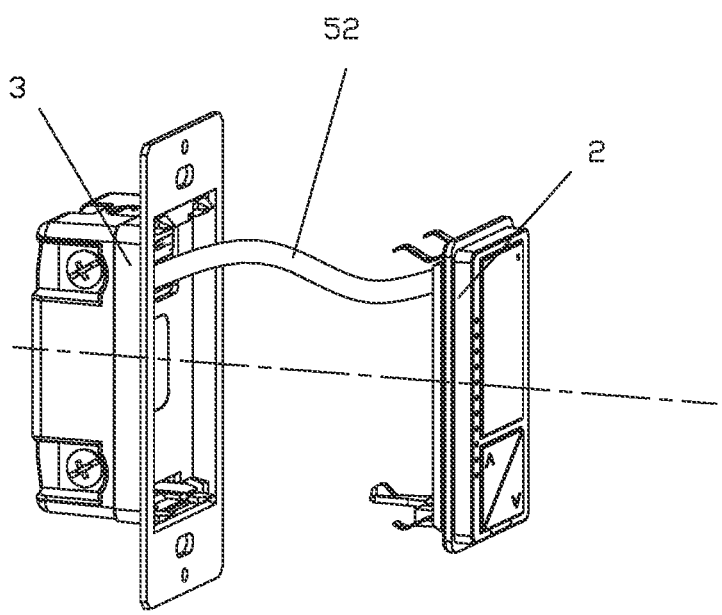
FIG. 20 illustrates an electrical connection diagram between a control operation module and a power and execution module of Embodiment 5 of the present disclosure.

Referring to FIG. 20, the combination electronic switch with the transformable combination of this present disclosure differs from Embodiment 1 in that the preset assemblies between the drive control assembly 21 of the control operation module 2 and the drive execution assembly 31 of the power and execution module 3 comprise flexible printed circuit (FPC) cables 52.

Embodiment 6

Figure 21:
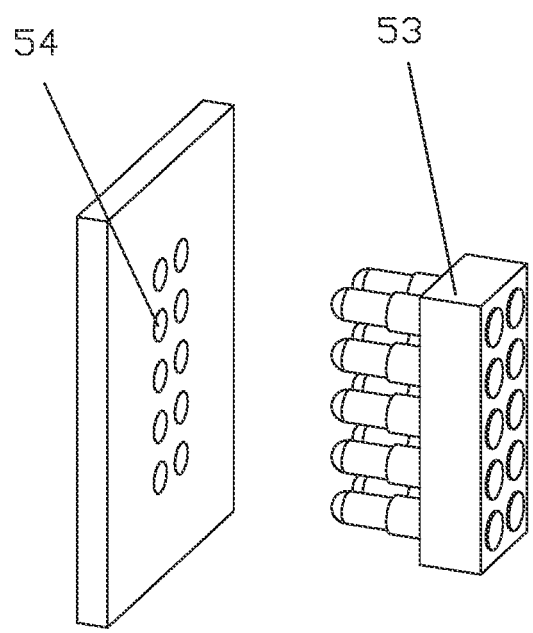
FIG. 21 illustrates an electrical connection diagram between a control operation module and a power and execution module of Embodiment 6 of the present disclosure.

Referring to FIG. 21, the combination electronic switch with the transformable combination of this present disclosure differs from Embodiment 1 in that the preset assemblies between the drive control assembly 21 of the control operation module 2 and the drive execution assembly 31 of the power and execution module 3 comprise an elastic pin component 53. The elastic pin component 53 is fixed on one of the drive control assembly 21 and the drive execution assembly 31, and a contact point 54 is disposed on the other of the drive control assembly 21 and the drive execution assembly 31.

Embodiment 7

Figure 22:
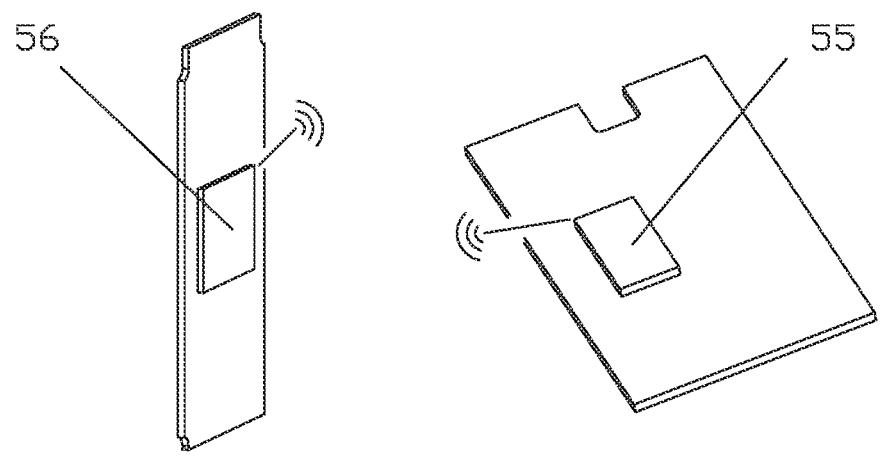
FIG. 22 illustrates an electrical connection diagram between a control operation module and a power and execution module of Embodiment 7 of the present disclosure.
Figure 23:
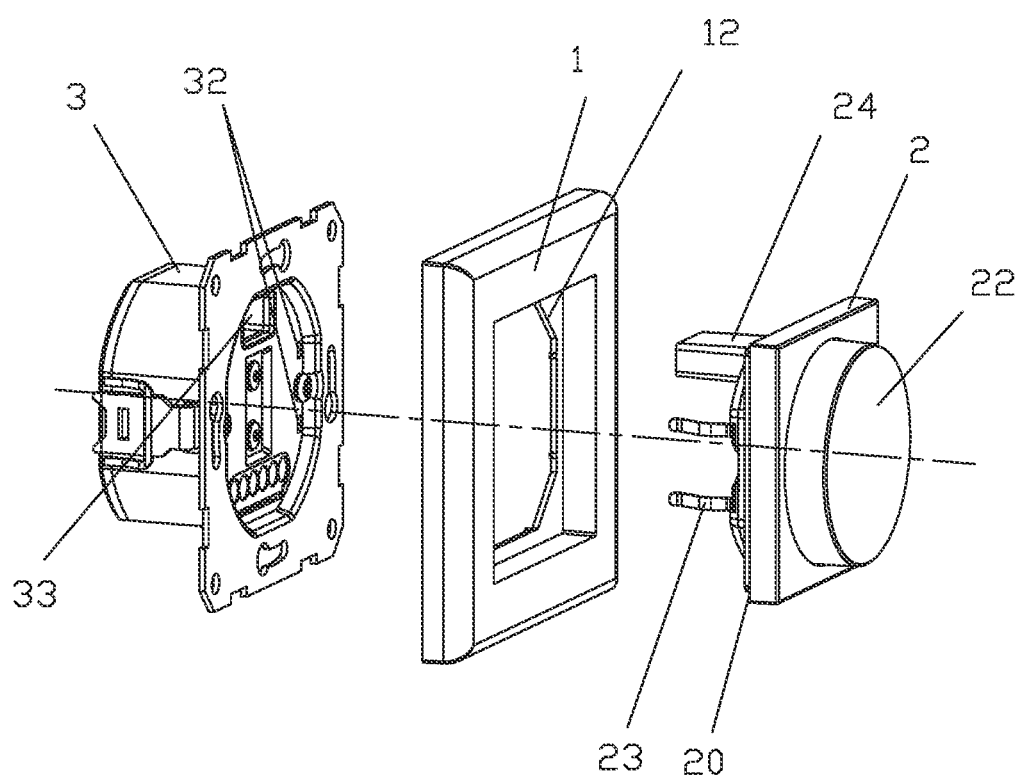
FIG. 23 illustrates an exploded view of Embodiment 8 of the present disclosure.
Figure 24:
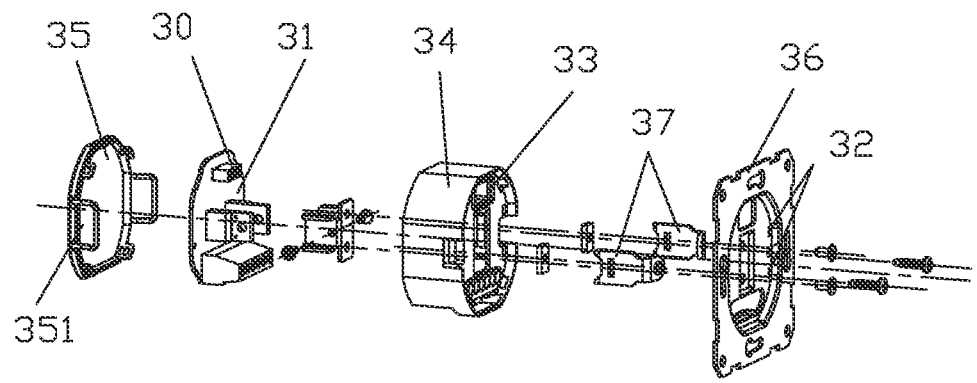
FIG. 24 illustrates an exploded view of a power and execution module (a dimmer) of Embodiment 8 of the present disclosure.
Figure 25:
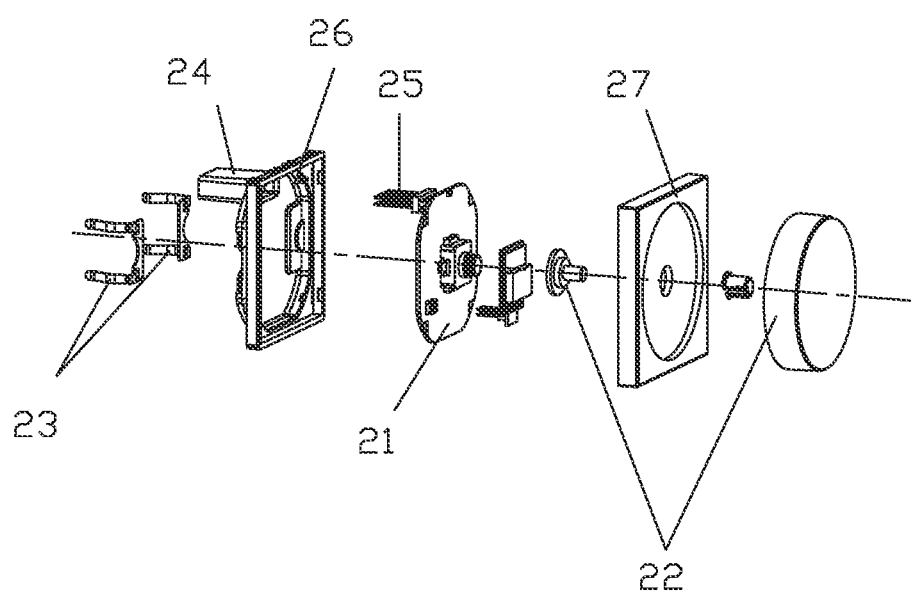
FIG. 25 illustrates an exploded view of a control operation module (a knob component) of Embodiment 8 of the present disclosure.
Figure 26:
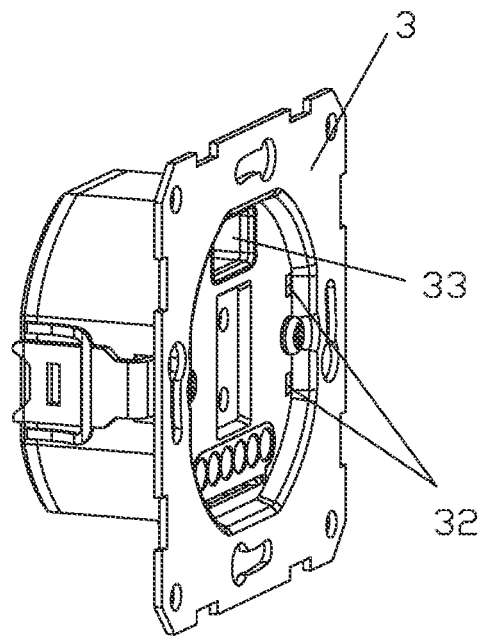
FIG. 26 illustrates a perspective view of the power and execution module (an electronic switch) of Embodiment 8 of the present disclosure.
Figure 27:
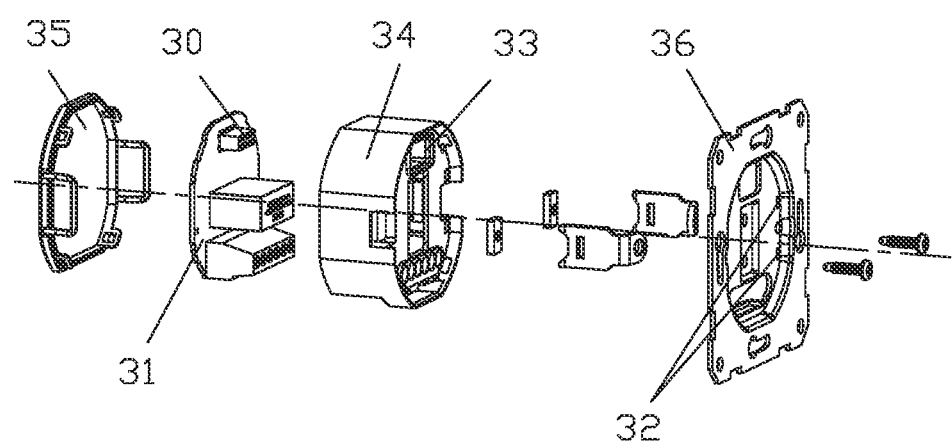
FIG. 27 illustrates an exploded view of the power and execution module (the electronic switch) of Embodiment 8 of the present disclosure.
Figure 28:
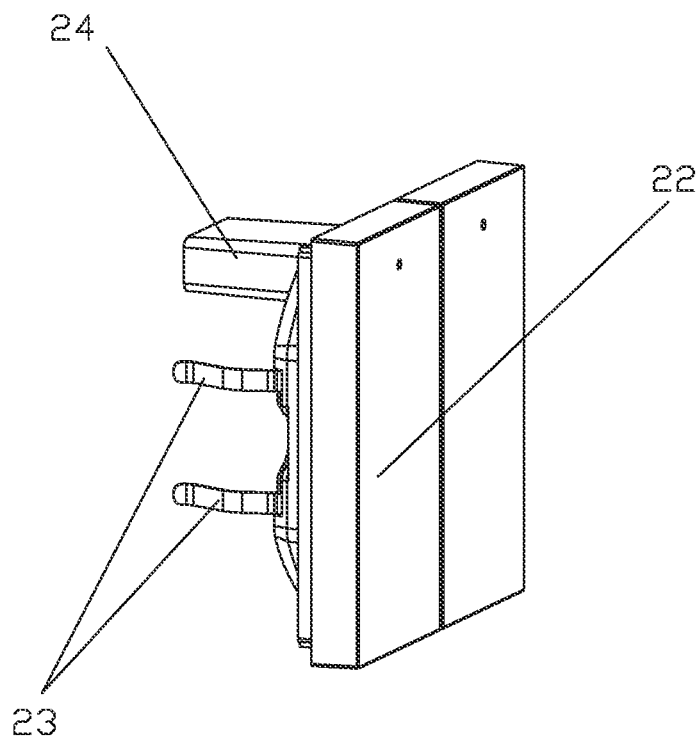
FIG. 28 illustrates a perspective view of the control operation module (an assembly of two buttons) of Embodiment 8 of the present disclosure.
Figure 29:
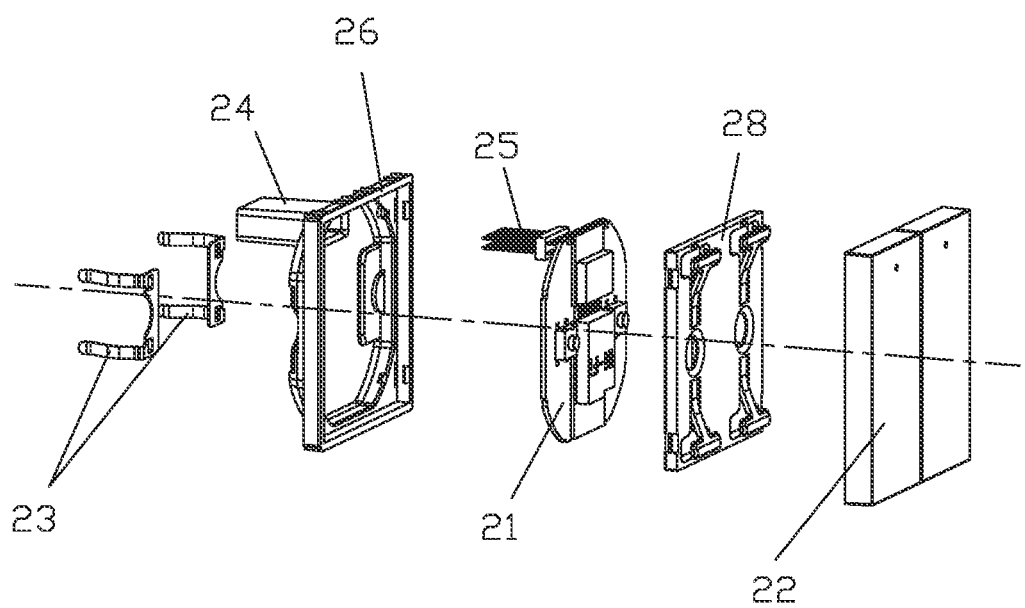
FIG. 29 illustrates an exploded view of the control operation module (the assembly of two buttons) of Embodiment 8 of the present disclosure.
Figure 30:
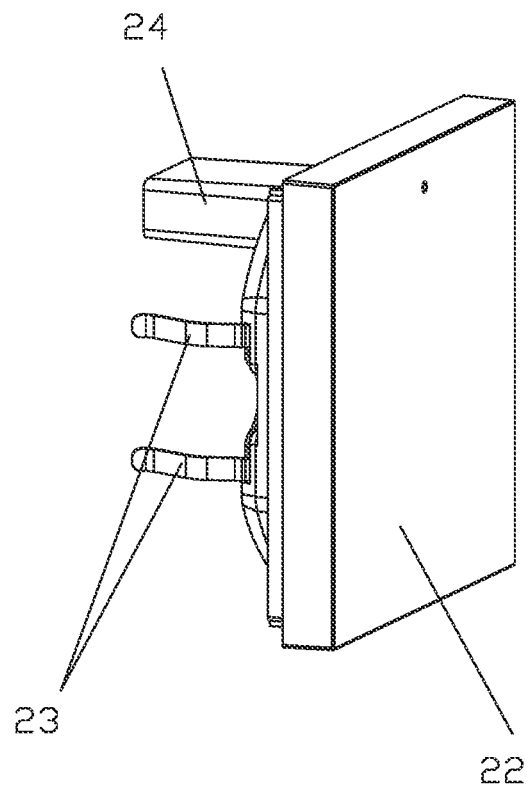
FIG. 30 illustrates a perspective view of the control operation module (a single button assembly) of Embodiment 8 of the present disclosure.
Figure 31:
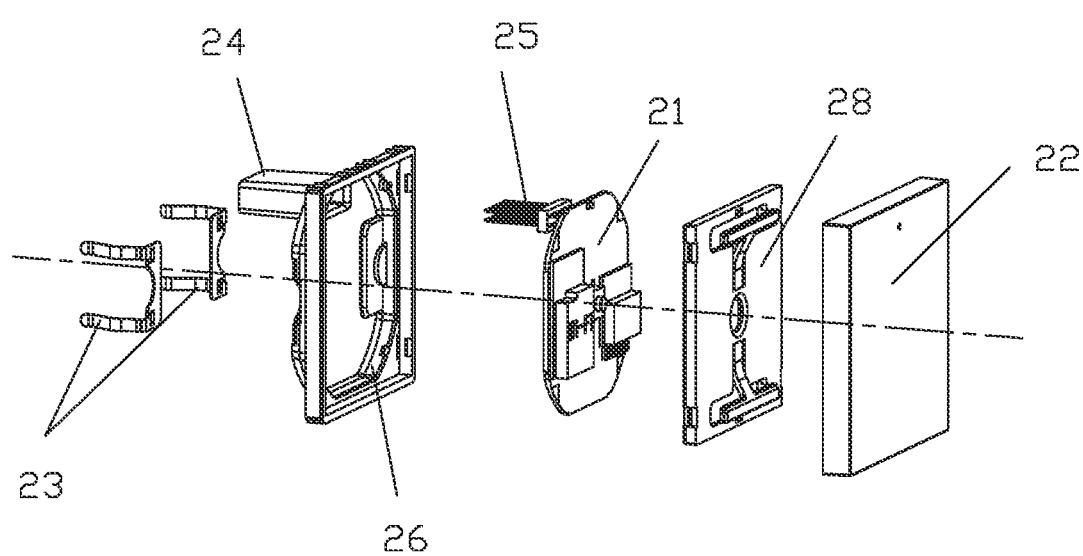
FIG. 31 illustrates an exploded view of the control operation module (the single button assembly) of Embodiment 8 of the present disclosure.
Figure 32:
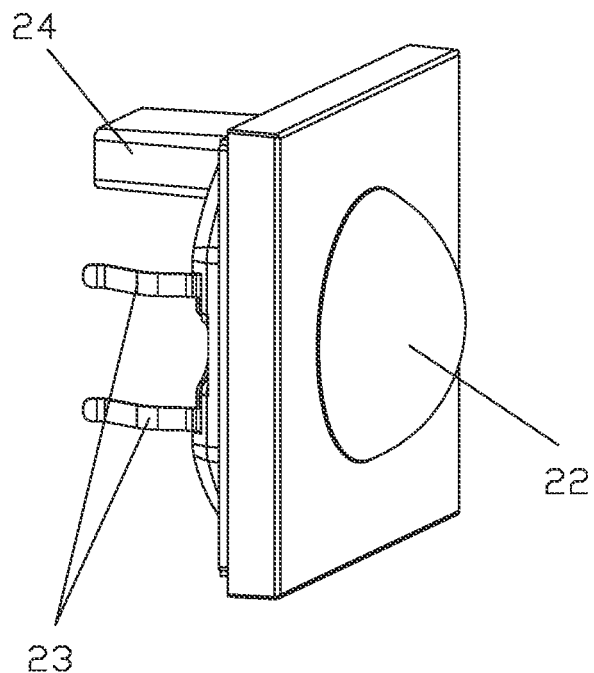
FIG. 32 illustrates an exploded view of the control operation module (a sensor assembly) of Embodiment 8 of the present disclosure.
Figure 33:
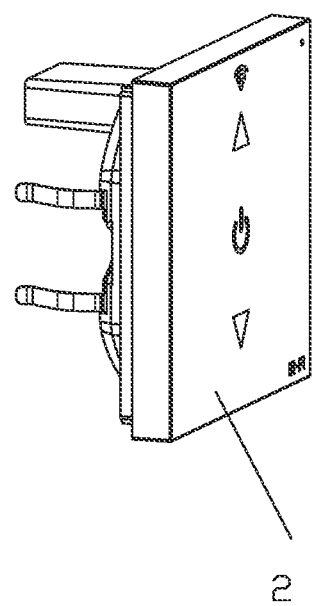
FIG. 33 illustrates a perspective view of a replacement member (a touching operation control component) of the control operation module of Embodiment 8 of the present disclosure.

Referring to FIG. 22, the combination electronic switch with the transformable combination of this present disclosure differs from Embodiment 1 in that the preset assemblies between the drive control assembly 21 of the control operation module 2 and the drive execution assembly 31 of the power and execution module 3 comprise wireless modules. A first wireless module 55 is disposed in the drive control assembly 21, and a second wireless module 56 is disposed in the drive execution assembly 31. The drive control assembly 21 of the control operation module 2 is wirelessly connected to the drive execution assembly 31 of the power and execution module 3.

Embodiment 8

Referring to FIGS. 23-33, the combination electronic switch with the transformable combination of this present disclosure differs from Embodiment 1 in that the inner side of the frame-shaped structure of the panel mounting module 1 is disposed with a second protruding flange 12, and the edge 20 of the control operation module 2 presses the second protruding flange 12 of the panel mounting module 1 toward the power and execution module 3. That is, the second protruding flange 12 of the panel mounting module 1 is sandwiched between the control operation module 2 and the power and execution module 3.

In this embodiment, a left portion and a right portion of the control operation module 2 are respectively disposed with the two elastic fixing claws 23.

In this embodiment, the power and execution module 3 comprises the first housing 300 in which the drive execution assembly 31 is disposed. The first housing 300 comprises a front cover 34, the rear cover 35, and the front fixing plate 36. The front fixing plate 36 is disposed with a metal fixing claw 37 protruding backward, and the rear cover 35 comprises a clamping slot 351. The front fixing plate 36 presses the front cover 34 toward the rear cover 35, and the metal fixing claw 37 of the front fixing plate 36 is clamped in the clamping slot 351 of the rear cover 35 to enable the front cover 34 to be clamped between the front fixing plate 36 and the rear cover 35. The drive execution assembly 31 is disposed in a cavity defined by the front cover 34 and the rear cover 35. The guiding slot 33 is disposed in the front cover 34, and the one or more clamping holes 32 are disposed on the front fixing plate 36.

In this embodiment, the control operation module 2 further comprises the second housing 200 in which the drive control assembly 21 is disposed. The second housing 200 at least comprises the operation rear cover 26, and the one or more elastic fixing claws 23 are fixed on the operation rear cover 26.

The panel mounting module 1, the control operation module 2, and the power and execution module 3 are all replaceable parts.

The panel mounting module 1 can be made into members with different materials (metal, plastic, etc.) and different colors. As needed, the panel mounting module 1 can be replaced. For example, the original metal panel mounting module 1 can be replaced with the plastic panel mounting module 1. The panel mounting module 1 can also be replaced to change colors.

The control operation module 2 can be made into components with different operation modes, such as rotation mode, pressing mode, touch mode, sensor mode, etc. The operation component 22 comprises the knob component, the button component, the touch component, the rocker component, the sensor component, or the sensor component with the button, etc. The initial operation component 22 of the control operation module 2 of this embodiment comprises the knob component (referring to FIGS. 23 and 25). At this time, the second housing 200 of the control operation module 2 further comprises an operation front cover 27, the knob component is disposed in the operation front cover 27, and the operation front cover 27 is fixed on the operation rear cover 26. As needed, the control operation module 2 can be replaced. For example, the control operation module 2 comprising the knob component be replaced with the control operation module 2 comprising a double-button structure (referring to FIGS. 28 and 29). At this time, the second housing 200 of the control operation module 2 does not comprise the operation front cover 27 but comprises an elastic frame 28 for a button assembly, and the operation component 22 of the control operation module 2 is the button assembly. Similarly, the control operation module 2 comprising the knob component can also be replaced with the control operation module 2 with the single button structure (referring to FIGS. 30 and 31) or can be replaced by the control operation module 2 with the sensor structure (referring to FIG. 32). At this time, the operation component 22 of the control operation module 2 is the sensor component, such as the infrared sensor, smoke sensor, the sound sensor, etc. As another example, the control operation module 2 comprising the knob component can be replaced with the control operation module 2 with a touch structure (referring to FIG. 33).

The power and execution module 3 can be made into components with different execution functions, such as the dimmer function or the electronic switch function. An initial structure of the power and execution module 3 of this embodiment comprises the dimmer structure (referring to FIGS. 23 and 24). As needed, the power and execution module 3 can be replaced. For example, the power and execution module 3 with the dimmer structure can be replaced with the power and execution module 3 with the electronic switch structure (referring to FIGS. 26 and 27).

Embodiment 9

Referring to FIG. 34, the combination electronic switch with the transformable combination of this present disclosure differs from Embodiment 1 in that the control operation module 2 comprises two communication modules 201, and the two communication modules 201 are directly attached to the circuit board of the drive control assembly 21.

Embodiment 10

Referring to FIG. 35, the combination electronic switch with the transformable combination of this present disclosure differs from Embodiment 1 in that the control operation module 2 comprises two communication modules 201. One of the two communication modules 201 is directly attached to the circuit board of the drive control assembly 21, and the other communication module 201 is detachably disposed on the circuit board of the drive control assembly 21 through a transition circuit board 202. The transition circuit board 202 is connected to the circuit board of the drive control assembly 21 due to male and female terminals 203 being connected together.

Embodiment 11

Referring to FIG. 36, the combination electronic switch with the transformable combination of this present disclosure differs from Embodiment 1 in that the control operation module 2 comprises two communication modules 201. One of the two communication modules 201 is directly attached to the circuit board of the drive control assembly 21, and the other communication module 201 is detachably disposed on the circuit board of the drive control assembly 21 through a transition circuit board 202. The transition circuit board 202 is connected to the circuit board of the drive control assembly 21 through the plug-in terminals 204.

Embodiment 12

Figure 37:
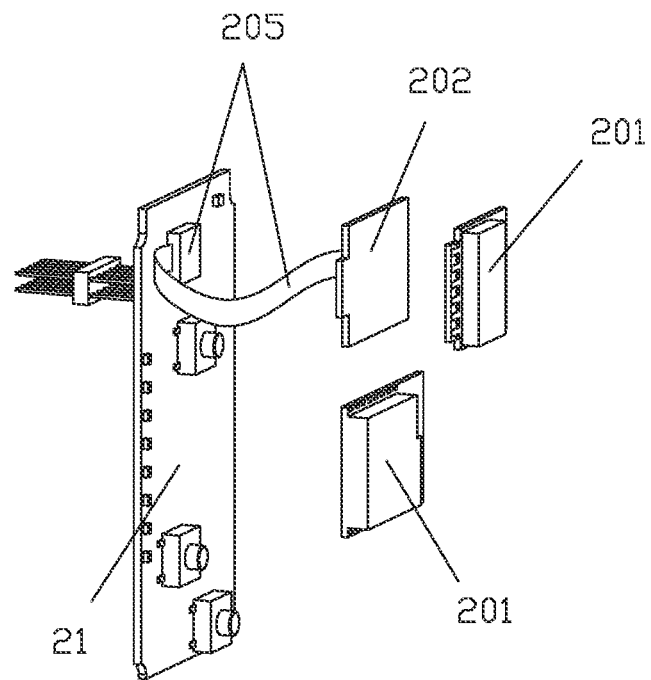
FIG. 37 illustrates a perspective view of an assembly of a communication module of a control operation module of Embodiment 12 of the present disclosure.

Referring to FIG. 37, the combination electronic switch with the transformable combination of this present disclosure differs from Embodiment 1 in that the control operation module 2 comprises two communication modules 201. One of the two communication modules 201 is directly attached to the circuit board of the drive control assembly 21, and the other communication module 201 is disposed on the circuit board of the drive control assembly 21 through a transition circuit board 202. The transition circuit board 202 is connected to the circuit board of the drive control assembly 21 through a combination of FPC and terminals.

Embodiment 13

Figure 38:
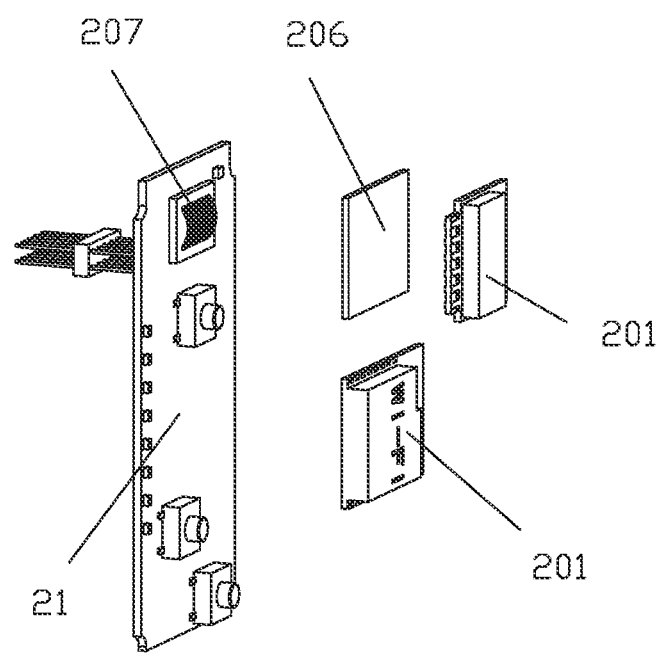
FIG. 38 illustrates a perspective view of an assembly of a communication module of a control operation module of Embodiment 13 of the present disclosure.

Referring to FIG. 38, the combination electronic switch with the transformable combination of this present disclosure differs from Embodiment 1 in that the control operation module 2 comprises two communication modules 201. One of two communication modules 201 is directly attached to the circuit board of the drive control assembly 21, and the other communication module 201 is disposed on the circuit board of the drive control assembly 21 through a communication bracket 206. The circuit board of the drive control assembly 21 is disposed with an elastic connector 207 configured to connect to the communication bracket 206.

The aforementioned embodiments are merely some embodiments of the present disclosure, and the scope of the disclosure of is not limited thereto. Various modifications, variations, and equivalents are possibly made according to the aforementioned embodiments by the skilled in this art, without departing from the scope of the scope of the present disclosure. Thus, it is intended that the present disclosure cover any modifications and variations of the presently presented embodiments provided they are made without departing from the appended claims and the specification of the present disclosure.

What is claimed is:

1. A combination electronic switch with a transformable combination, comprising:
   a control operation module,
   a power and execution module, and
   a panel mounting module, wherein:
   the control operation module comprises a drive control assembly comprising a preset drive control electronic element and an operation component configured to cooperate with the preset drive control electronic element,
   the power and execution module comprises a drive execution assembly comprising a preset drive execution electronic element configured to supply power for the control operation module,
   the drive control assembly of the control operation module is electrically connected to the drive execution assembly of the power and execution module through preset assemblies,
   the control operation module is fixed on the power and execution module, and
   the panel mounting module is fixed on the power and execution module through the control operation module or directly fixed on the power and execution module.

2. The combination electronic switch with the transformable combination according to claim 1, wherein:
   the control operation module is disposed with at least one communication module configured to cooperate with the preset drive control electronic element so as to be in communication with an external device, and
   the at least one communication module is fixed or detachably fixed on a circuit board of the drive control assembly.

3. The combination electronic switch with a transformable combination according to claim 1, wherein:
   one of the control operation module and the power and execution module is disposed with one or more elastic fixing claws,
   the other of the control operation module and the power and execution module is disposed with one or more clamping holes, and
   the control operation module is fixed on the power and execution module through cooperation between the one or more elastic fixing claws and the one or more clamping holes.

4. The combination electronic switch with the transformable combination according to claim 3, wherein:
   the one or more elastic fixing claws are disposed on the control operation module,
   an upper portion and a lower portion or a left portion and a right portion of the control operation module are respectively disposed with a plurality of elastic fixing claws of the one or more elastic fixing claws,
   corresponding positions of the power and execution module are respectively disposed with the one or more clamping holes, and
   the plurality of elastic fixing claws of the control operation module are clamped in the one or more clamping holes of the power and execution module to enable the control operation module to be fixed on the power and execution module.

5. The combination electronic switch with the transformable combination according to claim 4, wherein the plurality of elastic fixing claws are fixed on the control operation module by buckles.

6. The combination electronic switch with the transformable combination according to claim 1, wherein:
   one of the control operation module and the power and execution module is disposed with a magnet,
   the other of the control operation module and the power and execution module is disposed with an iron part, and
   the control operation module is fixed on the power and execution module through an adsorption cooperation between the magnet and the iron part.

7. The combination electronic switch with the transformable combination according to claim 1, wherein:
one of the control operation module and the power and execution module is disposed with a buckle, a turn button, or a fixing screw,
the other of the control operation module and the power and execution module is disposed with a buckle hole, a turn button hole, or a fixing screw hole, and
the control operation module is fixed on the power and execution module by cooperation between the buckle, the turn button, or the fixing screw and the buckle hole, the turn button hole, or the fixing screw hole.

8. The combination electronic switch with the transformable combination according to claim 7, wherein:
near a cooperation position of the buckle and the buckle hole,
each of the control operation module and the power and execution module are respectively disposed with an opening configured to facilitate disassembly between the control operation module and the power and execution module.

9. The combination electronic switch with the transformable combination according to claim 1, wherein:
the panel mounting module defines a frame-shaped structure,
the frame-shaped structure of the panel mounting module surrounds a periphery of the control operation module,
an inner side of the frame-shaped structure of the panel mounting module is disposed with a protruding flange, and
the protruding flange of the panel mounting module presses on an edge of the control operation module toward the power and execution module.

10. The combination electronic switch with the transformable combination according to claim 1, wherein:
the panel mounting module defines a frame-shaped structure,
the frame-shaped structure of the panel mounting module surrounds a periphery of the control operation module,
an inner side of the frame-shaped structure of the panel mounting module is disposed with a protruding flange, and
an edge of the control operation module presses the protruding flange of the panel mounting module toward the power and execution module.

11. The combination electronic switch with the transformable combination according to claim 1, wherein:
the operation component comprises at least one of a knob component, a button component, a touch component, a rocker component, a sliding component, a rotating component, a sensor component, and a detecting component.

12. The combination electronic switch with the transformable combination according to claim 1, wherein:
the preset assemblies between the drive control assembly of the control operation module and the drive execution assembly of the power and execution module comprise at least one of a terminal, a flat cable, a lead wire, an elastic pin, an elastic sheet, a buckle, a FPC cable, and a wireless module.

13. The combination electronic switch with the transformable combination according to claim 1, wherein:
one of the control operation module and the power and execution module is disposed with a guiding protrusion,
the other of the control operation module and the power and execution module is disposed with a guiding slot,
the preset assemblies between the drive control assembly of the control operation module and the drive execution assembly of the power and execution module are respectively disposed on the guiding protrusion and the guiding slot,
when the guiding protrusion of the one of the control operation module and the power and execution module is disposed in the guiding slot of the other of the control operation module and the power and execution module, the drive control assembly of the control operation module is electrically connected to the drive execution assembly of the power and the execution module.

\* \* \* \* \*